(12) United States Patent
Mercer et al.

(10) Patent No.: US 9,141,725 B2
(45) Date of Patent: Sep. 22, 2015

(54) INTEGRATION OF STATIC AND DYNAMIC DATA FOR DATABASE ENTITIES AND THE UNIFIED PRESENTATION THEREOF

(71) Applicant: QUALCOMM Incorporated, San Diego, CA (US)

(72) Inventors: Paul Mercer, Hillsborough, CA (US); Ralph Thomas, Palo Alto, CA (US); Srikiran Prasad, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/646,247

(22) Filed: Oct. 5, 2012

(65) Prior Publication Data

US 2013/0031073 A1    Jan. 31, 2013

Related U.S. Application Data

(63) Continuation of application No. 13/335,397, filed on Dec. 22, 2011, now Pat. No. 8,862,490, which is a continuation of application No. 12/033,576, filed on Feb. 19, 2008, now Pat. No. 8,266,187.

(51) Int. Cl.
*G06F 17/30* (2006.01)
*G06Q 10/10* (2012.01)
(Continued)

(52) U.S. Cl.
CPC ........ *G06F 17/30905* (2013.01); *G06Q 10/107* (2013.01); *H04L 12/581* (2013.01); *H04L 12/589* (2013.01); *H04L 51/04* (2013.01); *H04L 51/36* (2013.01); *H04L 67/36* (2013.01)

(58) Field of Classification Search
CPC .............. G06Q 30/02; G06Q 30/0601; G06Q 30/0267; G06Q 30/0269; G06Q 30/0255; G06Q 30/061; G06Q 10/10; G06Q 10/107; G06F 17/30; G06F 17/3002; G06F 17/30386; G06F 17/30864; G06F 17/30286; G06F 17/30905; H04L 12/581; H04L 51/04; H04L 51/36; H04L 12/589; H04L 67/36
USPC ...................... 707/705, 736, 795, 805, 999.1, 707/999.103, 999.105, 999.106, 7, 999.107, 707/770, 771, 802, 803, 807, 825, 912, 707/953; 709/206, 217, 207; 717/108, 165; 711/202; 715/749, 754, 759, 762, 777, 715/273, 700, 968; 455/415, 414.3; 700/52
See application file for complete search history.

(56) References Cited

U.S. PATENT DOCUMENTS 5,390,330 A * 2/1995 Talati ........................... 717/104
5,847,706 A    12/1998 Kingsley
(Continued)

FOREIGN PATENT DOCUMENTS

| CN | 1783083 A | 6/2006 |
|---|---|---|
| CN | 1902575 A | 1/2007 |
| EP | 1667013 A2 | 6/2006 |

OTHER PUBLICATIONS

Chinese Office Action, Application No. 200980112610.8, Date of Mailing: Dec. 31, 2012, pp. 1-8.
(Continued)

*Primary Examiner* — Greta Robinson
(74) *Attorney, Agent, or Firm* — Kilpatrick Townsend Stockton LLP

(57) ABSTRACT

A method is disclosed for presenting static and dynamic data corresponding to an entity within an application on a mobile device. An entity object is created as part of a data model within the application such that the entity object has a plurality of fields with the plurality of fields having static data corresponding to the entity. Based on the static data corresponding to the entity, dynamic data corresponding to the entity is received into the entity object from at least one of a plurality of applications executable within the mobile device. The static and dynamic data from the entity object corresponding to the entity is displayed simultaneously within a user interface of the application in a single presentation view.

18 Claims, 5 Drawing Sheets

(51) Int. Cl.
*H04L 12/58* (2006.01)
*H04L 29/08* (2006.01)

(56) References Cited

U.S. PATENT DOCUMENTS

| | | | |
|---|---|---|---|
| 6,002,400 | A | 12/1999 | Loring et al. |
| 6,341,174 | B1 | 1/2002 | Callahan et al. |
| 6,606,525 | B1 * | 8/2003 | Muthuswamy et al. ........ 700/52 |
| 6,647,410 | B1 * | 11/2003 | Scimone et al. ............. 709/206 |
| 7,003,327 | B1 | 2/2006 | Payne et al. |
| 7,194,516 | B2 * | 3/2007 | Giacobbe et al. ............. 709/206 |
| 7,480,872 | B1 | 1/2009 | Ubillos |
| 7,483,955 | B2 | 1/2009 | Gupta et al. |
| 7,587,684 | B2 | 9/2009 | Perttula |
| 7,595,810 | B2 | 9/2009 | Louch |
| 7,657,842 | B2 | 2/2010 | Matthews et al. |
| 7,739,604 | B1 | 6/2010 | Lyons et al. |
| 8,064,886 | B2 | 11/2011 | Hawkins et al. |
| 8,120,625 | B2 | 2/2012 | Hinckley |
| 8,135,796 | B1 * | 3/2012 | Slaughter et al. ............. 709/217 |
| 8,244,279 | B2 * | 8/2012 | Dicke et al. .................. 455/457 |
| 8,266,187 | B2 | 9/2012 | Mercer et al. |
| 2002/0147777 | A1 | 10/2002 | Hackbarth et al. |
| 2004/0025112 | A1 | 2/2004 | Chasen et al. |
| 2004/0088362 | A1 | 5/2004 | Curbow et al. |
| 2004/0261038 | A1 | 12/2004 | Ording et al. |
| 2005/0091608 | A1 | 4/2005 | Gusmorino et al. |
| 2006/0004911 | A1 | 1/2006 | Becker et al. |
| 2006/0041460 | A1 | 2/2006 | Aaron |
| 2006/0095976 | A1 | 5/2006 | Torres et al. |
| 2006/0224992 | A1 | 10/2006 | Rossi et al. |
| 2006/0229063 | A1 | 10/2006 | Koch |
| 2007/0043687 | A1 | 2/2007 | Bodart et al. |
| 2007/0168060 | A1 | 7/2007 | Nixon et al. |
| 2007/0293207 | A1 * | 12/2007 | Guedalia et al. ............. 455/415 |
| 2008/0005692 | A1 | 1/2008 | Hoblit |
| 2008/0028315 | A1 | 1/2008 | Kaplan |
| 2008/0140498 | A1 | 6/2008 | Setty et al. |
| 2008/0141162 | A1 | 6/2008 | Bockus |
| 2008/0221909 | A1 | 9/2008 | Muhonen et al. |
| 2008/0282179 | A1 | 11/2008 | Kim et al. |
| 2009/0013282 | A1 | 1/2009 | Mercer |
| 2009/0210394 | A1 | 8/2009 | Saravanan et al. |
| 2012/0096401 | A1 | 4/2012 | Mercer et al. |

OTHER PUBLICATIONS

Extended European Search Report, European Patent Application No. 11195440.0, Date of Completion: Feb. 29, 2012, Date of Mailing: Feb. 29, 2012, pp. 1-6.
PCT International Search Report and Written Opinion, PCT Application No. PCT/US2009/032714, Sep. 1, 2009.
Supplementary Partial European Search Report, EP Application No. 09715719, Date of Completion of the Search: Nov. 29, 2011, Date Mailed: Dec. 7, 2011, pp. 1-7.
PCT International Search Report and Written Opinion, PCT Application No. PCT/US2008/068827, Oct. 7, 2008.
Office Action, Application No. CN200980112610. Date of Issuance: Oct. 22, 2013, pp. 1-11.

* cited by examiner

INTEGRATION OF STATIC AND DYNAMIC DATA FOR DATABASE ENTITIES AND THE UNIFIED PRESENTATION THEREOF

RELATED APPLICATIONS

This application is a continuation of U.S. patent application Ser. No. 13/335,397, filed on Dec. 22, 2011, which in turn is a continuation of U.S. patent application Ser. No. 12/335,397, filed on Feb. 19, 2008, now U.S. Pat. No. 8,266,187, each of which is incorporated by reference herein in its entirety.

BACKGROUND

1. Field of Art

The present disclosure relates to a mobile device and a method of presenting static and dynamic data corresponding to a database entity within an application on a mobile device.

2. Description of the Related Art

Applications that manage contacts and related static information currently exist in personal computers, instant messenger services, e-mail services, smart phones, and certain web-based services. Such static information includes contact details such as names, addresses, telephone numbers, e-mail addresses, and instant messenger identifiers. Typically, a user may select, e.g., click, on a telephone number, which then connects the user to a separate phone application or service that then dials the number. Alternately, the user may click on an e-mail address which launches a separate e-mail application, which enables the user to send an e-mail to the chosen contact from within the separate e-mail application.

Additionally, there are applications that manage dynamic data related to contacts, data that are time-sensitive in nature. For example, an instant messaging application or an e-mail application may provide dynamic data such as online availability of a chosen contact at a particular point in time.

In order for a user to determine if a chosen contact is available online for instant messaging, the user may click on an instant message identifier for the chosen contact to launch a separate instant messaging service to then locate the chosen contact within the service. Hence, the determination of the user's online availability happens within a separate application. Alternately, the user may launch an instant messaging service, such as an AOL instant messaging (AIM) service, directly and locate the chosen contact within the list of the user's favorite contacts or "buddies" to determine whether the chosen contact is online at that moment. Despite the availability of an AOL "buddy" for instant messaging purposes, a separate e-mail application would need to be launched in order to send an e-mail to the same AOL "buddy" since the instant messaging service and the e-mail service bear no relationship to each other.

Currently, applications exist that bring contact information, blogs, and pictures into an instant messaging application but such applications are web-based and contacts are typically not looked up using a web browser. Separate applications are launched for dynamic data specific to each different type of static data. For example, an e-mail application such as Microsoft Outlook does not show the weather at the location of a contact within the application, rather, the user must separately inquire for that data within, for example, a web site. Thus, true integration of disparate contact-based data has not been achieved on computing devices.

In general, in order for the user to connect to a contact listed in a contacts application, the user is forced to select different types of static data related to a contact to launch one of several separate applications to access dynamic data specific to the selected type of static data. Such an approach is time-consuming and cumbersome especially when the user needs to connect to several contacts which necessitates that the user repeatedly locate each of these contacts in separate applications.

The other significant drawback to accessing various separate applications for dynamic data specific to the selected type of static data is that the user is forced to switch between multiple presentation views for each contact, one for each type of static data related to the contact and each separate application that is launched to access dynamic data related to the contact. When the user clicks on an AIM link, the current view is replaced by an application view for AIM showing the contact. Owing to the multitude of different types of static data associated with a single contact, the user is forced to click on each type of data or link to launch (or execute) one of many separate applications to access dynamic data corresponding to each type of static data, which further compounds the problem.

Owing to the time-sensitive nature of certain types of contact-specific dynamic data, such as online status in an instant messaging service, the user is forced to connect to the service repeatedly at various instances of time to determine the online status of the same contact. Hence, the other significant drawback to launching separate applications to access dynamic data tied to static data related to contacts is the need to constantly refresh either the view or the dynamic data from these separate applications.

Furthermore, if the user inadvertently terminates an instant messaging service launched in response to the user selecting a contact's instant messaging identifier from the contacts application, the user has no alternative but to re-connect to the instant messaging service and locate the contact again.

Thus, the art lacks, inter alia, configurations in which static data related to contacts within an application executed on a computing device is combined with dynamic data all within a contacts application.

SUMMARY

One aspect of a system (and process) combines static data corresponding to a database entity with dynamic data based on the static data corresponding to a database entity all within a single application on a mobile device. The system (and process) presents static and dynamic data corresponding to an entity within an application on a mobile device. An entity object is created within the application such that the entity object has multiple fields that contain static data corresponding to the entity. Based on the static data corresponding to the entity, the entity object receives dynamic data corresponding to the entity from one or more applications executable within the mobile device. Static and dynamic data from the entity object corresponding to the entity are displayed simultaneously within a user interface of the application.

At least one application that retrieves dynamic data corresponding to the entity is based on a network service on a data network. Such network services include, but are not limited to, an instant messenger service, a telephone service, a maps service, a weather service, a blogging service, a photo service, and a location-based service.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

Specific embodiments in accordance with the present disclosure will now be described, by way of example only, with reference to the drawings. A brief description of each drawing is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
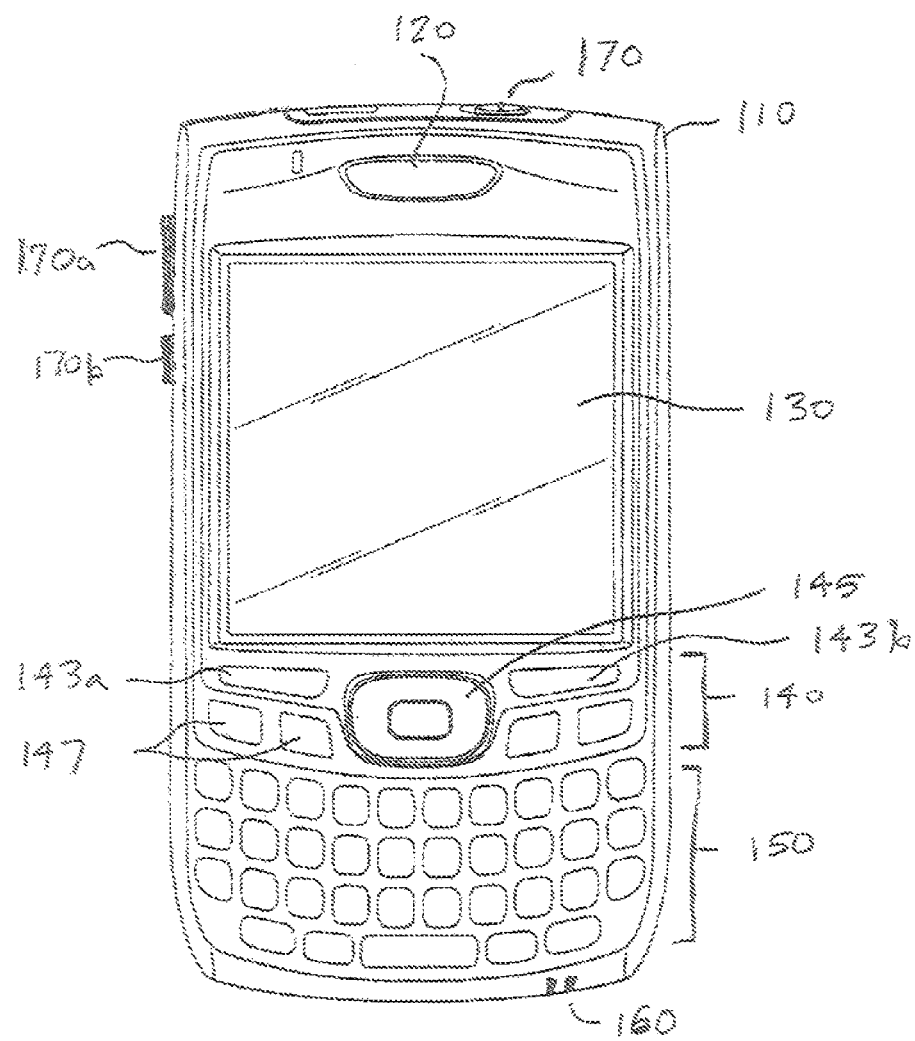
FIG. 1 illustrates one embodiment of a mobile computing device.

FIG. 1 illustrates one embodiment of a mobile computing device 110 with telephonic functionality, e.g., a mobile phone or a smart phone. The mobile computing device is configured to host and execute a phone application for placing and receiving telephone calls. It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) or data networks having voice over internet protocol (VoIP) functionality.

The mobile computing device 110 is configured to be of a form factor that is convenient to hold in a user's hand, for example, a personal digital assistant (PDA) or a smart phone form factor. For example, the mobile computing device 110 can have dimensions ranging from 7.5 to 15.5 centimeters in length, 5 to 12.75 centimeters in width, 0.64 to 2.2 centimeters in height and weigh between 55 and 230 grams.

The mobile computing device 110 includes a speaker 120, a screen 130, a navigation area 140, a keypad area 150, and a microphone 160. The mobile computing device 110 also may include one or more switches 170, 170a, and 170b (generally 170). The one or more switches 170 may be buttons, sliders, or rocker switches and can be mechanical or solid state (e.g., touch sensitive solid state switch).

The screen 130 of the mobile computing device 110 is, for example, a 240.times.240, a 320.times.320, or a 320.times.480 transflective display. For example, the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 120 further comprises a touch-sensitive display (e.g., pressure-sensitive (resistive), electrically sensitive (capacitative), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The navigation area 140 is configured to control functions of an application executing in the mobile computing device 110 and visible through the screen 130. For example, the navigation area includes an x-way (x is e.g., 5) navigation ring 145 that provides cursor control, selection, and similar functionality. In addition, the navigation area 140 may include selection buttons 143a, 143b to select functions viewed just above the buttons on the screen 130. In addition, the navigation area 140 also may include dedicated function buttons 147 for functions such as, for example, a calendar, a web browser, an e-mail client or a home screen. In this example, the navigation ring 145 may be implemented through mechanical, solid state switches, dials, or a combination thereof. The keypad area 150 may be a numeric keypad (e.g., a dialpad) or a numeric keypad integrated with an alpha or alphanumeric keypad 160 (e.g., a keyboard with consecutive keys of QWERTY, AZERTY, or other equivalent set of keys on a keyboard).

Although not illustrated, it is noted that the mobile computing device 110 also may include an expansion slot (not shown). The expansion slot is configured to receive and support expansion cards (or media cards), which may include memory cards such as CompactFlash™ cards, SD cards, XD cards, Memory Sticks™, MultiMediaCard™, SDIO, and the like.

Figure 2:
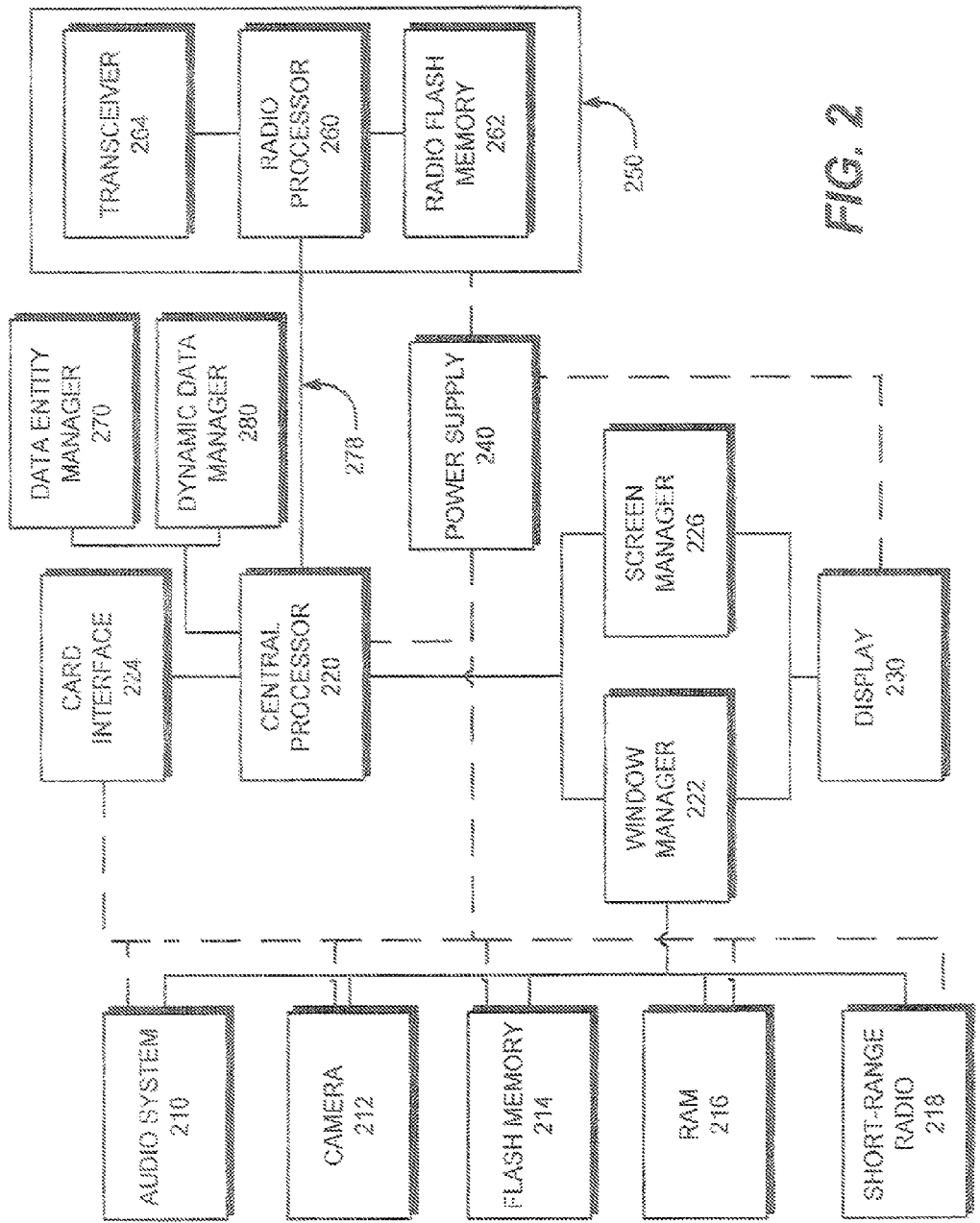
FIG. 2 illustrates one embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIG. 1. The mobile computing device 110 includes a central processor 220, a power supply 240, and a radio subsystem 250. The central processor 220 communicates with: audio system 210, camera 212, flash memory 214, RAM memory 216, short range radio module 218 (e.g., Bluetooth, Wireless Fidelity (WiFi) component), removable memory 272 (e.g., SD card), a window manager 222, and a screen manager 226. The power supply 240 powers the central processor 220, the radio subsystem 250 and a display driver 230 (which may be contact- or inductive-sensitive). The power supply 240 may correspond to a battery pack (e.g., rechargeable) or a powerline connection or component.

In one embodiment, the window manager 222 comprises a software or firmware process that initializes a virtual display space stored in the RAM 216 and/or the flash memory 214. The virtual display space includes one or more applications currently being executed by a user and the current status of the executed applications. The window manager 222 receives requests, from user input or from software or firmware processes, to show a window and determines the initial position of the requested window. Additionally, the window manager 222 receives commands or instructions to modify a window, such as resizing the window, moving the window or any other command altering the appearance or position of the window, and modifies the window accordingly.

The screen manager 226 comprises a software or firmware process that manages content displayed on the screen 130. In one embodiment, the screen manager 226 monitors and controls the physical location of data displayed on the screen 130 and which data is displayed on the screen 130. The screen manager 226 alters or updates the location of data on the screen 130 responsive to input from the central processor 220, to modify the screen 130 appearance. In one embodiment, the screen manager 226 also monitors and controls screen brightness and transmits control signals to the central processor 220 to modify screen brightness and power usage to the screen 130.

The radio subsystem 250 includes a radio processor 260, a radio flash memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, multiple Access (CDMA system), and a Universal Mobile Telecommunications System (UMTS). Examples of data networks include General Packet Radio Service (GPRS), third-generation (3G) mobile, High Speed Download Packet Access (HSDPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using a serial line 278.

The card interface 224 is adapted to communicate with the expansion slot. The card interface 224 transmits data and/or instructions between the central processor 220 and an expansion card, media card, or removable memory source included in the expansion slot. The card interface 224 also transmits control signals from the central processor 220 to the expansion slot to configure an expansion card, media card, or removable memory source included in the expansion slot.

The data entity manager 270 is operably linked to the central processor 220 and comprises a software or firmware process that manages static and dynamic data corresponding to an entity. In one embodiment, the data entity manager 270 is further configured to display simultaneously within a user interface the static and dynamic data corresponding to the entity.

The dynamic data manager 280 is operably linked to the central processor 220 and comprises a software or firmware process that manages the addition from various applications of dynamic data corresponding to the entity to static data corresponding to the entity.

In one embodiment, central processor 220 executes logic (by way of programming, code, instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

Figure 3A:
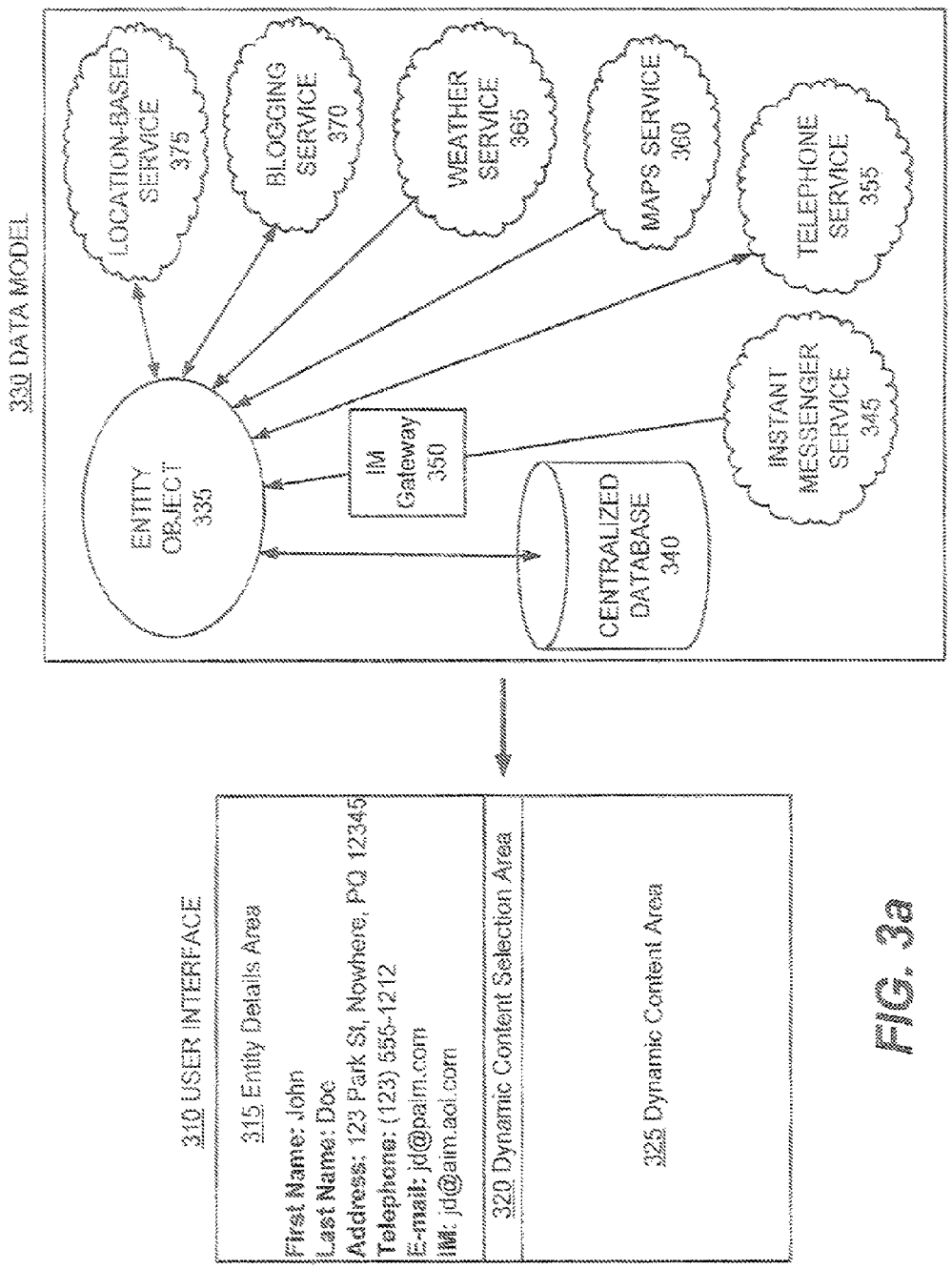
FIG. 3a illustrates one embodiment of a method of rendering static and dynamic data on a user interface of a mobile computing device based on a corresponding data model.

FIG. 3a illustrates one embodiment of a method of rendering static and dynamic data on a user interface 310 of the mobile computing device 110 based on a corresponding data model 330. The user of the mobile computing device 110 initiates the process of generation of the data model 330 for an entity by opening a contacts application on the device 110 and selecting a particular contact or entity listed within. In one embodiment, the user interface 310 is associated with the data model 330 and is rendered by the data model 330. The data model 330 takes advantage of the data-driven nature of contact related information and uses the underlying data to represent the contact related information in several ways. This underlying data is extensible and so multiple entities can modify or extend this data. Every contact or entity is considered as a repository of additional information. The data model 330 is a single, centralized representation of a contact and the contact is considered a data entity. The data model 330 enables a system-wide, mobile, and extensible framework that can plug in new services or applications starting with static contact information to allow streaming of dynamic contact information based on the static information.

The extensible framework enables selection of a contact and mining the information related to the contact in order to access various external sources of information relating to the contact. Examples of external sources include online availability, weather at a contact's location, and telephone number status details such as busy or unavailable. The extensible framework allows data to be pushed into the data model 330 so that the data model 330 represents a single hub for information gathering.

The centralized database 340 may have static data on an entity named "John Doe" that includes additional static data on the entity such as first and last name, e-mail address, and contact information. The data model 330 for an entity is based on the creation of an entity object 335 for the entity instantiated with the static data on the entity such as "John Doe". The entity object 335 receives additional dynamic data from a data network and once data is in the entity object it is displayed on a user interface 310. Based on the contents of the static data, additional services that run in the background are able to plug into the entity object 335 to provide dynamic data to the entity object 335 to enable contact-centric dynamic information streaming. In one embodiment, examples of services include an instant messenger service 345, a telephone service 355, a maps service 360, a weather service 365, a blogging service 370, and a location-based service 375.

For example, an instant messenger service 345 such as AOL® instant messenger (AIM) may be running in the background and since it is on the network it can retrieve contacts who are online at that moment. Accordingly, this allows access to live data as to whether the selected contact or additional contacts in the user's contacts application are available or not. In one embodiment, the AIM service runs in the background as an application managed by an operating system on the mobile device. Optionally, using an instant messenger (IM) gateway 350, the instant messenger service 345 adds dynamic data generated during chat sessions between the user and the selected contact, such as chat conversations, as new attributes of the entity object 335 previously instantiated with static data corresponding to the selected contact.

The contacts application is not required to continuously add dynamic data corresponding to all contacts in a user's contact list one at a time provided by each service. For example, the instant messenger service 345 may connect to an AIM service and determine which of the contacts in the user's contact list is online and back map that dynamic information to the names in the contact list as a batch process. For example, the instant messenger service 345 knows prior to the user selecting John Doe from the contacts list that "John Doe" is online but the address book may not get updated until the user selects "John Doe" from the contacts list. In other cases, gaining a priori knowledge on all contacts in a contacts list would be unnecessary if not practical. For example, it would be unnecessary to look up the weather at every location for every contact in the contact list if such information is not sought by the user. In one embodiment, the contacts application described herein retrieves and caches, in a batch mode, dynamic data related to a group of contacts and updates the dynamic data for a contact within the group when the contact is selected from within the contacts application.

Alternately, a telephone service 355 such as a Sprint®, AT&T®, Vodafone®, T-Mobile®, or Orange™ telephone service may be invoked as an application executable within the mobile device. Contacts in the address book or contacts list of the contacts application typically have associated telephone numbers and so the telephone service can inform the contacts application as to whether the selected contact or additional contacts in the user's contacts application are available. For example, a configuration may show a particular contact is available to converse and accordingly, a "talk" button may be used to initiate a conversation between the user and the selected contact. Here, the device 110 is configured so that telephone service 355 adds dynamic data generated during telephone conversations between the user and the selected contact, such as content of telephone conversations, as new attributes of the entity object 335 previously instantiated with static data corresponding to the selected contact.

In one embodiment, the static data on a contact may originate from a calendar associated with the contacts, which then allows the static data to be linked to dynamic data that is retrieved by the various services. For example, the user's calendar entry for a particular day may state that the user is meeting with John Doe at a John Doe's location at a particular time. The contacts application then retrieves available static data on John Doe, e.g., John Doe's contact information, including photo of John Doe. The contact application links this information to dynamic data that is retrieved by weather service 365 to provide a weather forecast at the location and time of the scheduled meeting. Thus, within a single view, a user is given a more complete view of not only who John Doe is but the environmental aspects, e.g., weather, surrounding the meeting with John Doe.

The entity object 335 builds a live view of the world based on a static view that previously existed. The live view is captured to the extent that it is available based on the static data and a communication connection is available and made to the various services that are capable of providing dynamic data to generate the live view. Starting with a static view of an entity in the contact list a variety of external networks become available to provide a wider dynamic view of the entity by adding dynamic content to the static view.

Based on an address in the address book of the contacts application, additional information may be received over a network. For example, building on the example above, if the contact "John Doe" is selected by the user then John Doe's address card view may be analyzed to determine that John Doe's current location is Baltimore. Thereafter, if the application is configured to retrieve weather details, the weather service 365 runs as an application executable within the mobile device and provides current weather information in Baltimore to the entity object 335.

The system as disclosed that includes the entity object model may apply to other applications. For example, in one embodiment, the application may relate to photos of interest to a user rather than to contact information. The user's static data may include information such as an address, a location, topics of interest, or simply a list of hobbies. The photo application analyzes the static data entries and accesses a network service configured to retrieve dynamic data that corresponds to the static data, for example, photos pertaining to various aspects of the user's static data. Other dynamic data may include a user's personal data hosted within a network service, for example, photos previously accessed.

In further embodiments, additional services may be configured to run as applications executable within the mobile device to add dynamic data to the entity object 335. For example, dynamic data on the presence of the selected contact, e.g., traffic information in the vicinity of current location or the type of food the contact is consuming at a restaurant at a particular moment may be provided by the location-based service 375. The maps service 360 adds map-related information based on contact-centric information keyed off static data corresponding to the contact. Similarly, a blogging service 370 may add photos related to the static data of the contact as dynamic data to the entity object 335 corresponding to the contact.

In one embodiment, the entity is a business contact, for example, a retail and service operation such as Best Buy. The user of the mobile device may either actively or passively connect with the business contact listed within the contacts application before dynamic data corresponding to the business object is added to the corresponding entity object 335. In a passive connection, for example, the presence of the user of the mobile device may in the vicinity of a listed business location or another location of the same business, e.g., another Best Buy location, is sufficient to stream in dynamic data to the entity object 335 corresponding to the business. The location based service 375, e.g., a GPS system, uses the static data, such as the name of the business, to identify the nearest Best Buy store relative to a current location, which may or may not be the location listed within the contacts application. Dynamic data corresponding to the identified business location such as address of the location if different from the listed address, driving directions to the location, distance to the location, coupons or deals, and live support information may then be added to the entity object 335 corresponding to the business.

The location-based service 375 may plug into any commerce network listed as a contact within the contacts application. The commerce network may include a network service provided by the commerce network. For example, if Starbucks is listed as one of the business contacts of the user and the user is walking to a Starbucks location for coffee, the user may receive dynamic data from a competing business in the vicinity of the user's current location. Such dynamic data that is added to the entity object 335 may take the form of a live coupon from Peete's coffee, located perhaps a block away from the intended Starbucks location. Alternately, in an active connection, for example, the user may look for Best Buy in the address book, select it, connect to it, and stream in dynamic data corresponding to either the selected Best Buy location or another Best Buy location in the vicinity of the current location of the user.

Dynamic data corresponding to a business may also be added to the entity object 335 by one or more alternate services available on the mobile computing device 110. For example, the instant messaging service 345, may enable the user to send an instant message to a help desk at the identified location of Best Buy based on an instant messaging identifier present as part of the static data or dynamically retrieved by a network service. Associated dynamic data, such as chat conversations, may be added to the entity object 335. Alternately, a telephone service 355, may enable the user to establish a phone link with technical support personnel. This is also advantageous to the business contact since this enables the business support staff to help many more customers once the customers automatically connect to the business via a mobile device. Additionally, this enables the business to ensure that there are no language barriers for support staff once a customer connects automatically with an appropriate support staff matched by spoken language. In one embodiment, the contacts application is a dashboard into a business since it serves as another contact point into the business.

Dynamic data corresponding to a business may also be added to the entity object 335 by one or more alternate services that are located and installed on the mobile computing device 110. For example, the contacts application may query for and install a network service from a website associated with Best Buy and launch the network service to provide dynamic data on Best Buy to the entity object 335. Alternately, the new network service may be preloaded to obtain the live dynamic information. The Best Buy contact providing the new network service is integrated into the phone book of the contacts application and the corresponding network service runs as an application executable within the mobile device.

Dynamic data corresponding to a business associated with the user's calendar may also be added to the corresponding entity object 335. For example, the business could be an airline and the user's calendar may have an entry corresponding to flight information for an upcoming business trip. The flight information entry may have associated with it static data such as airline name, flight number, scheduled departure time, and similar information on connecting flights. Dynamic data such as flight delays or flight cancellations may be streamed to the corresponding entity object 335 to enable the user to make explore alternate flight options, if any.

In addition to gathering and assembling data together from various sources, the data model 330 renders a user interface 310 that provides a single view of a selected contact. The single representation enables the display of static and dynamic contact information within a single presentation session as opposed to multiple presentation sessions. Once a contact is selected, and the entity object 335 is created as part of the data model 330, the user interface 310 displays an entity details area 315 that contains static data relating to the contact, a dynamic content area 325 that displays dynamic data in response to a selection made in a dynamic content selection area 320. For example, the entity details area 315 may show the name and contact information for a contact, e.g., John Doe, and a selection in the dynamic content selection area 320 requesting weather information in John's Doe's current location causes the dynamic content area 325 to display the requested weather information.

The user interface 310 displays static data and interaction with the static data to add dynamic data is enabled within the same view or presentation as opposed to jumping to another view to access the dynamic information. The user interface 310 thus allows a contact centric view of data and services all in one place because it enables a single view of the address card that simultaneously displays static and dynamic data and nor merely because static data is retrieved for display from a single centralized database 340. In one embodiment, the user interface 310 takes static data corresponding to a contact and makes it dynamic within the same view. Integration of static and dynamic data within a single view is made possible because of the ability to access a multitude of systems based on static data within that same view and add dynamic data from the multitude of systems all in the same view. In one embodiment, the user interface 310 is a dashboard for every contact selected from a contact list that serves contact-centric information.

The dynamic data retrieved by various services/applications based on the static information is either time-sensitive or time-insensitive in nature. For example, a contact's online availability in an instant messaging application is time-sensitive in nature but a record of user-generated chat conversations is time-insensitive in nature. In one embodiment, if it is determined that the dynamic data corresponding to an entity is time-insensitive in nature, the dynamic data is saved in a database cache for quick retrieval. In one embodiment, if it is determined that the dynamic data corresponding to an entity is time-sensitive in nature, the dynamic data is not saved in a database cache and is retrieved by the services/applications every time a request for the dynamic data is made.

Figure 3B:
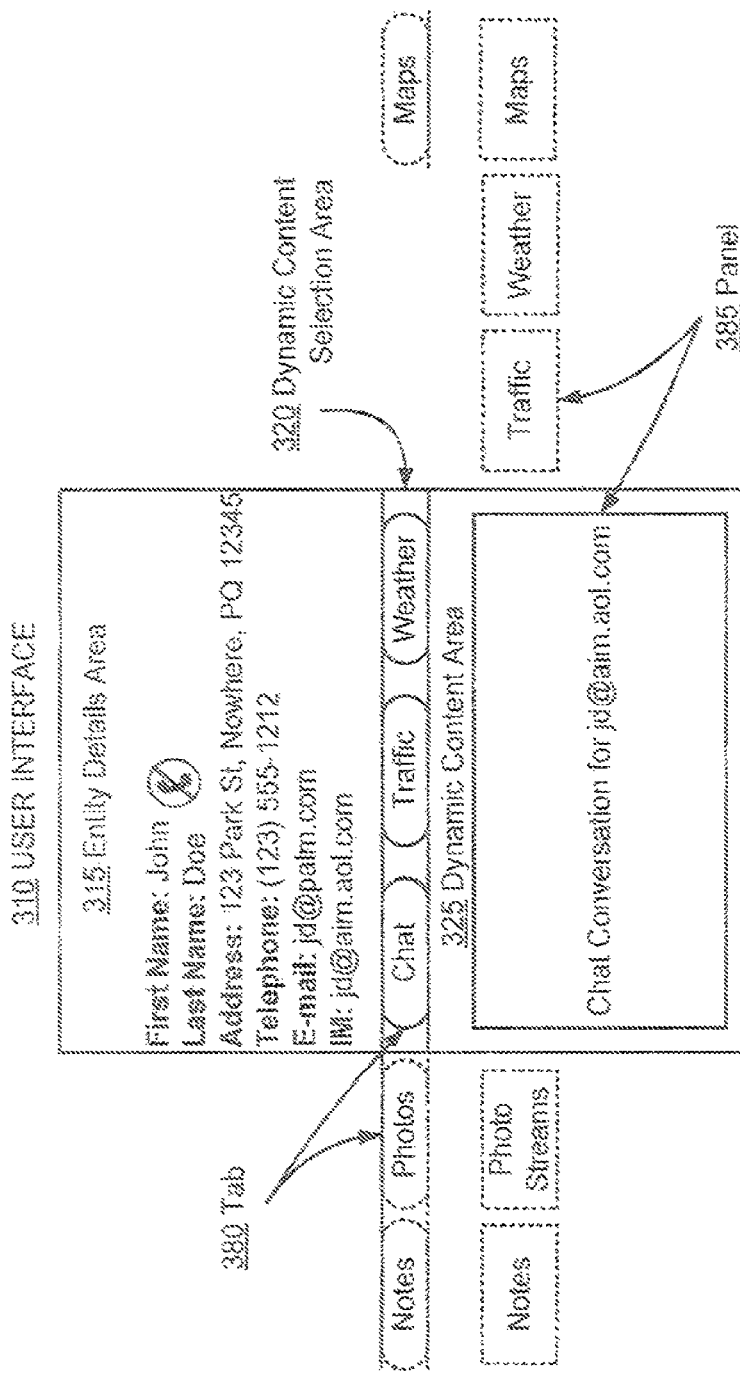
FIG. 3b illustrates one embodiment of a method of presenting static and dynamic data on a user interface of a mobile computing device.

FIG. 3b illustrates one embodiment of a method of presenting static and dynamic data on a user interface 310 of a mobile computing device. The user interface 310 displays a entity details area 315 that contains static data relating to the contact and a dynamic content area 325 that displays dynamic data in response to a selection made in the dynamic content selection area 320. In one embodiment, the entity details area 315 is enhanced to display dynamic data corresponding to the contact in addition to the static data corresponding to the contact. For example, FIG. 3b illustrates by means of a telephone symbol next to the name of the contact, John Doe, that the contact is currently not accessible by telephone.

In one embodiment, the tabs 380 in the dynamic content selection area 320 can be inferred from the static and dynamic data. The tabs 380 may not be a one-to-one correspondence to data fields in the entity details area 315 but may be related to the data fields. For example, an address may relate to either a maps tab or a weather tab, an instant messaging identifier may correspond to a chat tab, and a company domain name may correspond to company information or more specifically to stock information. The user interface 310 enables displaying static and dynamic information all within a single view and session. In one embodiment, the data fields are checked to determine what the tabs are going to be. In another embodiment, the applications installed in the system determine what the tabs are going to be. Wherever service agreements exist with application vendors the dynamic content selection area 320 may be prepopulated with tabs. The user's personal view with contact information can have a privacy lock switch so that such information may be shielded for security reasons. In one embodiment, the user's dynamic content selection area 320 may have extra tabs.

The dynamic content area 325 displays dynamic content on one of many panels 385 that correspond to one of many tabs 380. In one embodiment, the user may select a tab 380 in the dynamic content selection area 320 and cause a corresponding panel 385 to be displayed in the dynamic content area 325. The contacts application may place the tabs and corresponding panels in circular queues such that there is correspondence between the selected tab in the dynamic content selection area 320 and the panel displayed in the dynamic content area 325. In one embodiment, the user may "flick" through the panels using a finger or stylus to cause the corresponding tab 380 to be selected and displayed in the dynamic content selection area 320. In one embodiment, the contacts application infers the dynamic content of the panels 385 from the static data in the entity details area 315. The panels 385 may display dynamic data that are actionable, e.g., e-mail and telephone links.

The user interface 310 represents a centralized contact dashboard for the mobile computing device 110 with a rich presentation of static and dynamic data. The panels 385 in the dynamic content area 325 are created based on static data fields that are present within the entity details area 315. Each panel corresponds to at least one of the data fields. Navigation between the panels 385 is done either by a gesture or motion or through some other form of user interface interaction through a device or touch screen. In one embodiment, selection of a particular data entry within the entity details area 315 causes a corresponding panel 385 to become active so that the user may act on the dynamic content provided in the panel 385.

In an alternative embodiment, a photo application may be organized such that the entity details area 315 may contain static data fields such as the user's address and/or location and additional dynamic data such as photos related to the user's location and/or address may be displayed in panels 385 in the dynamic content area 325. In one embodiment, panels 385 and tabs 380 are present all within the same presentation view without leaving the view. The single presentation view allows for a single look and feel.

In one embodiment, the user may have personal notes on each contact which may be mined for additional dynamic data by invoking additional services or applications that add the dynamic data to the same view based on static data present in the notes.

Besides accessing contacts from within the phone book or a contacts application on a mobile device, the current windowing system allows the data for a selected contact to be extracted out of phone book to a whole new window. For example, if there is a need to talk to Best Buy all day then the contact information may be extracted out of the contacts applications and placed on the desktop for quick access all day long. This avoids having to go back to the contacts application and drilling in to again find the contact Best Buy. Similarly, if the user wishes to have a phone conversation with a contact for prolonged periods at various times of the day then this contact may be extracted from the contacts application and placed on the desktop for quick and ready access.

Figure 4:
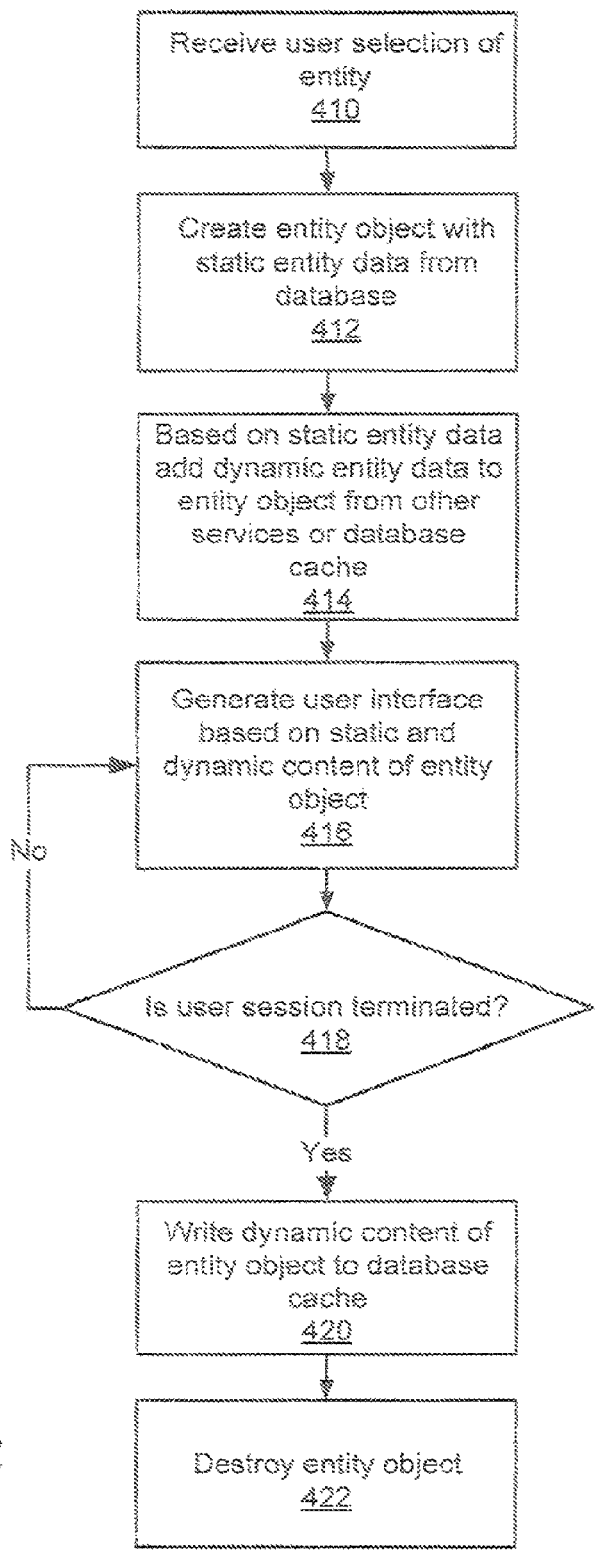
FIG. 4 illustrates one embodiment of a method of presenting static and dynamic data corresponding to a database entity within an application on a mobile device.

FIG. 4 illustrates one embodiment of a method of presenting static and dynamic data corresponding to a database entity within an application on a mobile device. To initiate the process the user selects an entity, such as a contact, from within a contacts application so that the contacts application receives 410 the user selection of the entity. In one embodiment, the user selection renders a user interface 310 that displays, in the entity details area 315, contact details of the entity based on static data corresponding to the entity.

The contacts application creates 412 an entity object 335 based on static data corresponding to the entity. In one embodiment, the entity object 335 is created from static fields corresponding to the entity in the centralized database 340. In one embodiment, the centralized database 340 dynamically creates the entity object 335. Based on static data corresponding to the entity, the contacts application adds 414 dynamic data corresponding to the entity to the entity object 335 from various services for time-sensitive dynamic data or from the database cache for time-insensitive dynamic data.

The contacts application generates 416 a user interface 310 based on static and dynamic data in the entity object 335 corresponding to the entity. In one embodiment, the user interface 310 displays, in the entity details area 315, contact details of the entity based on static data corresponding to the entity, a dynamic content selection area 320 inferred from the static and dynamic data corresponding to the entity, and a dynamic content area 325 based on dynamic data corresponding to the entity. In one embodiment dynamic content area 325 displays panels 385 with dynamic data corresponding to the selected tab 380 in the dynamic content selection area 320.

If the contacts application is closed or if the user selects a second entity, the user session for the first entity is terminated 418 and every piece of user-generated dynamic data that is time-insensitive, such as chat conversations corresponding to the first entity, is saved in a database cache. In one embodiment, time-insensitive dynamic data corresponding to an entity is saved by writing 420 the data to a database cache maintained by the centralized database 340. Once the dynamic data corresponding to an entity is saved, the entity object 335 for the entity is destroyed 422. In one embodiment, when the entity object 335 corresponding to an entity is destroyed the user remains connected to the various services that previously existed. For example, the user is not signed out of an instant messaging service if the user was previously connected to the service during the existence of the entity object 335 for an entity and all transient data generated during chat sessions with the entity, such as chat conversations, are saved once the entity object 335 gets destroyed (e.g., deleted).

It will be appreciated that any of the examples of presenting static and dynamic data corresponding to a database entity within an application on a mobile device discussed above can be used with this embodiment, and that any of the optional features of any of the embodiments described herein could also be provided with one or more of any of the other embodiments described herein.

Insofar as embodiments described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods, apparatus and system is envisaged as an aspect of the present disclosure. For example, the processor described with respect to FIGS. 1 and 2 may be embodied as instructions of a computer program. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. These instructions may be executable by a processor. A skilled person would readily understand that term "computer" in its most general sense encompasses programmable devices such as referred to above, and data processing apparatus and computer systems.

Suitably, the computer program is stored on a carrier (or tangible computer readable) medium in machine readable form, for example the carrier medium may comprise memory, removable or non-removable media, erasable or non-erasable media, writeable or re-writeable media, digital or analog media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (DVD) subscriber identify module, tape, cassette solid-state memory. The computer program may be supplied from a remote source embodied in the communications medium such as an electronic signal, radio frequency carrier wave or optical carrier waves. Such carrier media are also envisaged as aspects of the present disclosure.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and method of presenting static and dynamic data corresponding to a database entity within an application on a mobile computing device through the disclosed principles herein. Thus, while particular embodiments and applications have been illustrated and described, it is to be understood that the present disclosure is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method of presenting static and dynamic data corresponding to an entity within a first application, the method comprising:
   identifying, within the first application on a mobile device, static data corresponding to an entity;
   receiving, based on the static data corresponding to the entity, dynamic data from at least a second application from among a plurality of applications executable within the mobile device, the second application being different from the first application, said dynamic data corresponding to the entity; and
   displaying simultaneously, within a user interface of the first application, the static and dynamic data corresponding to the entity, wherein the user interface displays an entity details area, a dynamic content selection area, and a dynamic content area in a single view, said entity details area containing static data, and said dynamic content area displaying the dynamic data in response to a selection made in the dynamic content selection area.

2. The method of claim 1, wherein the dynamic data corresponds to an advertisement corresponding to a business competing with the entity.

3. The method of claim 1, further comprising:
   extracting information corresponding to at least one of the static data and the dynamic data from an entity object within the first application; and
   placing the extracted information on a desktop for quick access.

4. The method of claim 1, wherein the second application is different from a web-browsing application.

5. The method of claim 1, further comprising:
   receiving the static data corresponding to the entity from a calendar application.

6. The method of claim 1, wherein the second application corresponds to an instant messaging application and the dynamic data is generated during chat sessions between a user of the mobile device and the entity.

7. An apparatus of presenting static and dynamic data corresponding to an entity within a first application, the apparatus comprising at least one processor and a memory coupled to the at least one processor, the at least one processor configured to:
   identify, within the first application on the apparatus, static data corresponding to an entity;
   receive, based on the static data corresponding to the entity, dynamic data from at least a second application from among a plurality of applications executable within the apparatus, the second application being different from the first application, said dynamic data corresponding to the entity; and
   display simultaneously, within a user interface of the first application, the static and dynamic data corresponding to the entity, wherein the user interface displays an entity details area, a dynamic content selection area, and a dynamic content area in a single view, said entity details area containing static data, and said dynamic content area displaying the dynamic data in response to a selection made in the dynamic content selection area.

8. The apparatus of claim 7, wherein the dynamic data corresponds to an advertisement corresponding to a business competing with the entity.

9. The apparatus of claim 7, wherein the processor is further configured to:
    extract information corresponding to at least one of the static data and the dynamic data from an entity object within the first application; and
    place the extracted information on a desktop for quick access.

10. The apparatus of claim 7, wherein the second application is different from a web-browsing application.

11. The apparatus of claim 7, wherein the processor is further configured to:
    receive the static data corresponding to the entity from a calendar application.

12. The apparatus of claim 7, wherein the second application corresponds to an instant messaging application and the dynamic data is generated during chat sessions between a user of the apparatus and the entity.

13. An apparatus for presenting static and dynamic data corresponding to an entity within a first application, comprising:
    means for identifying, within the first application on the apparatus, static data corresponding to an entity;
    means for receiving, based on the static data corresponding to the entity, dynamic data from at least a second application from among a plurality of applications executable within the apparatus, the second application being different from the first application, said dynamic data corresponding to the entity; and
    means for displaying simultaneously, within a user interface of the first application, the static and dynamic data corresponding to the entity, wherein the user interface displays an entity details area, a dynamic content selection area, and a dynamic content area in a single view, said entity details area containing static data, and said dynamic content area displaying the dynamic data in response to a selection made in the dynamic content selection area.

14. The apparatus of claim 13, wherein the dynamic data corresponds to an advertisement corresponding to a business competing with the entity.

15. The apparatus of claim 13, further comprising:
    means for extracting information corresponding to at least one of the static data and the dynamic data from an entity object within the first application; and
    means for placing the extracted information on a desktop for quick access.

16. The apparatus of claim 13, wherein the second application is different from a web-browsing application.

17. The apparatus of claim 13, further comprising:
    means for receiving the static data corresponding to the entity from a calendar application.

18. The apparatus of claim 13, wherein the second application corresponds to an instant messaging application and the dynamic data is generated during chat sessions between a user of the apparatus and the entity.

* * * * *